(12) United States Patent
Heidingsfelder

(10) Patent No.: US 9,556,882 B2
(45) Date of Patent: Jan. 31, 2017

(54) TURBOCHARGER WITH VARIABLE TURBINE GEOMETRY

(75) Inventor: Leif Heidingsfelder, Ramstein (DE)

(73) Assignee: BorgWarner Inc., Auburn Hills, MI (US)

( * ) Notice: Subject to any disclaimer, the term of this patent is extended or adjusted under 35 U.S.C. 154(b) by 552 days.

(21) Appl. No.: 14/115,505

(22) PCT Filed: Apr. 30, 2012

(86) PCT No.: PCT/US2012/035755
§ 371 (c)(1),
(2), (4) Date: Nov. 4, 2013

(87) PCT Pub. No.: WO2012/154432
PCT Pub. Date: Nov. 15, 2012

(65) Prior Publication Data
US 2014/0050573 A1  Feb. 20, 2014

(30) Foreign Application Priority Data

May 10, 2011 (DE) .......................... 10 2011 101 037

(51) Int. Cl.
*F04D 29/40* (2006.01)
*F01D 17/16* (2006.01)
*F01D 25/16* (2006.01)
*F02C 6/12* (2006.01)
*F02C 9/22* (2006.01)
*F02B 37/24* (2006.01)

(52) U.S. Cl.
CPC .............. *F04D 29/40* (2013.01); *F01D 17/165* (2013.01); *F01D 25/162* (2013.01); *F02B 37/24* (2013.01); *F02C 6/12* (2013.01); *F02C 9/22* (2013.01); *Y02T 10/144* (2013.01); *Y10T 29/49336* (2015.01)

(58) Field of Classification Search
CPC ...... F04D 29/40; F01D 17/165; F01D 25/162; F01B 37/24
See application file for complete search history.

(56) References Cited

U.S. PATENT DOCUMENTS

| | | | |
|---|---|---|---|
| 6,558,117 B1 * | 5/2003 | Fukaya | F01D 17/165 415/160 |
| 7,010,915 B2 * | 3/2006 | Stilgenbauer | F01D 17/165 415/160 |
| 2010/0008766 A1 * | 1/2010 | Scholz | F01D 17/165 415/160 |

(Continued)

*Primary Examiner* — Woody Lee, Jr.
(74) *Attorney, Agent, or Firm* — A. Michael Tucker; Stephan A. Pendorf; Patent Central LLC

(57) ABSTRACT

A turbocharger (15) with variable turbine geometry, having a blade bearing ring arrangement (1) which has a blade bearing ring (2) and a disk (3) which is fixed to the blade bearing ring (2) so as to create a flow duct (4), having guide blades (5') mounted in the blade bearing ring (2), and having a spacer device (5) which is arranged between the blade bearing ring (2) and the disk (3) so as to set a defined width (B) of the flow duct (4). The spacer device (5) is formed as an inlet guide grate (6) which has movable inlet guide blades (8) which are arranged in each case on a spacer pin (7) which is fixed with its first end (7A) to the blade bearing ring (2). Also, a method for producing a blade bearing ring arrangement (1).

11 Claims, 6 Drawing Sheets

(56) References Cited

U.S. PATENT DOCUMENTS

2010/0154415 A1* 6/2010 Ehrhard ................ F01D 17/165
 60/605.1
2012/0251302 A1* 10/2012 Ramb ................... F01D 17/165
 415/170.1

* cited by examiner

TURBOCHARGER WITH VARIABLE TURBINE GEOMETRY

The invention relates to a turbocharger with variable turbine geometry (VTG) as per the preamble of claim 1.

The VTG cartridge of such a turbocharger known from EP-A-1 236 866 has a guide apparatus with blades and levers and a turbine-housing-side disk. The fastening of the disk to a blade bearing ring of a blade bearing arrangement is realized, in generic turbochargers, by means of screws or welding. To be able to set a defined width for the flow path which is formed between the blade bearing ring and the disk and in which the blades of the VTG are situated, a spacer device is provided. In the prior art, said spacer device is constructed from spacer sleeves, stepped bolts or welded pegs. Furthermore, cast spacer elements are also known.

However, any component which extends through the exhaust-gas flow constitutes an obstruction to the flow, and therefore generates flow losses.

It is therefore an object of the present invention to provide a turbocharger of the type specified in the preamble of claim 1, with which it is possible to minimize the influence of the separating components on the flow and avoid intense deflections.

Said object is achieved by means of the features of claim 1.

According to the invention, an inlet guide grate with a variable component is provided in order to deflect the exhaust-gas flow toward the guide blade apparatus of the variable turbine geometry in a load-dependent manner. The variable component of the variable inlet guide grate moves relative to the blade bearing ring in accordance with the angle adjustment of the variable turbine geometry, whereby it is possible to deflect the exhaust-gas flow toward the variable turbine geometry with varying intensity.

Furthermore, a streamlined design yields improved gas dynamics within the guide apparatus, and therefore improved thermodynamics of the turbocharger as a whole.

The particular advantage of the inlet guide grate according to the invention lies in the fact that the flow is deflected such that it strikes the following guide blade preferably at a shallower angle. Through said angle adjustment of the variable inlet guide grate, it is possible to attain an optimum blade incident flow for all load states. The influence of the spacer device on the exhaust-gas flow is advantageously kept low in this way.

The subclaims relate to advantageous refinements of the invention.

Claim 11 defines a method for producing a blade bearing ring arrangement of a turbocharger with variable turbine geometry (VTG).

Further details, features and advantages of the invention will emerge from the following description of exemplary embodiments on the basis of the drawing, in which.

Figure 1:
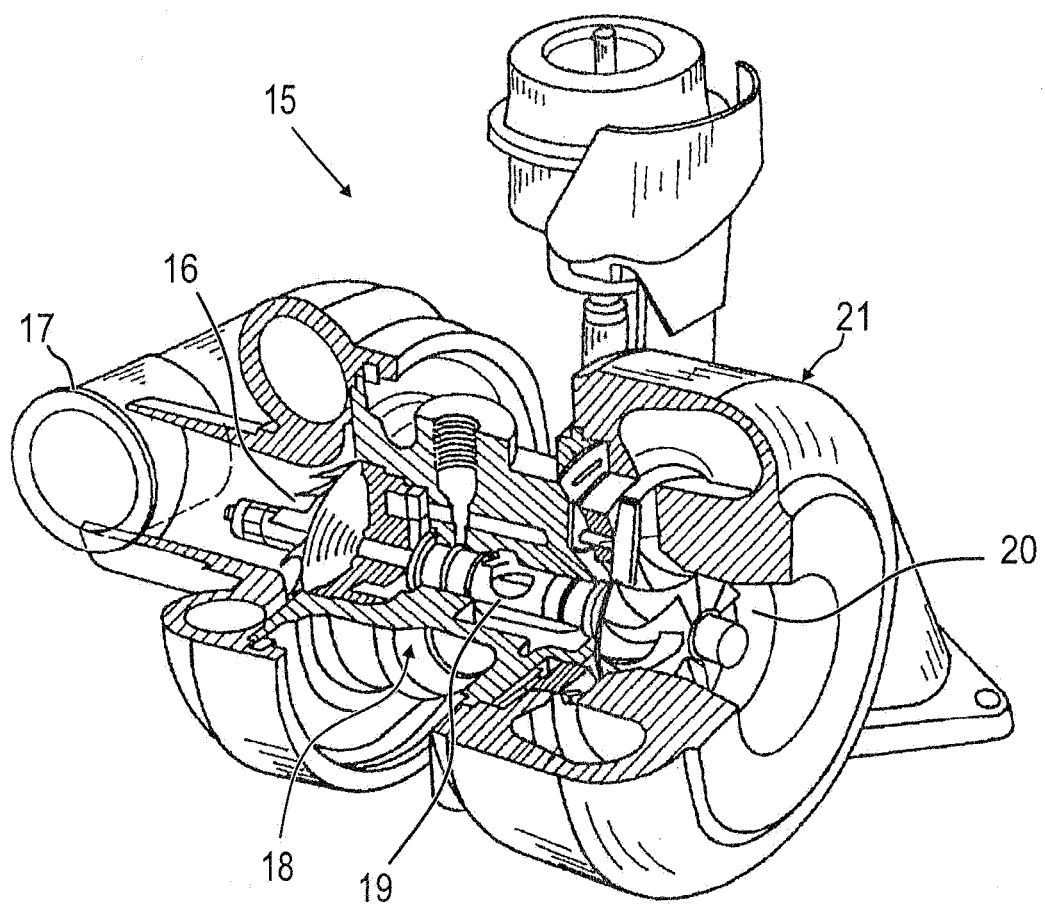
FIG. 1 shows a perspective illustration of a turbocharger according to the invention.

Since a complete explanation of all the structural details of a turbocharger with variable turbine geometry is not necessary for the following description of the design principles according to the invention, only the basic components of a turbocharger 15 according to the invention are labeled in FIG. 1, said turbocharger having, as is conventional, a compressor wheel 16 in a compressor housing 17, a bearing housing 18 having the necessary bearings for a shaft 19, and a turbine wheel 20 in a turbine housing 21. Said turbocharger also has a so-called VTG cartridge which comprises rotatable blades and levers and a turbine-housing-side disk and also a blade bearing ring and an adjusting ring. Said components will be explained in detail on the basis of the following figures. The other parts of a turbocharger of said type are not necessary for explaining the present invention so as to provide complete understanding of the principles thereof, but are self-evidently likewise provided in the turbocharger 15 according to the invention.

Figure 2:
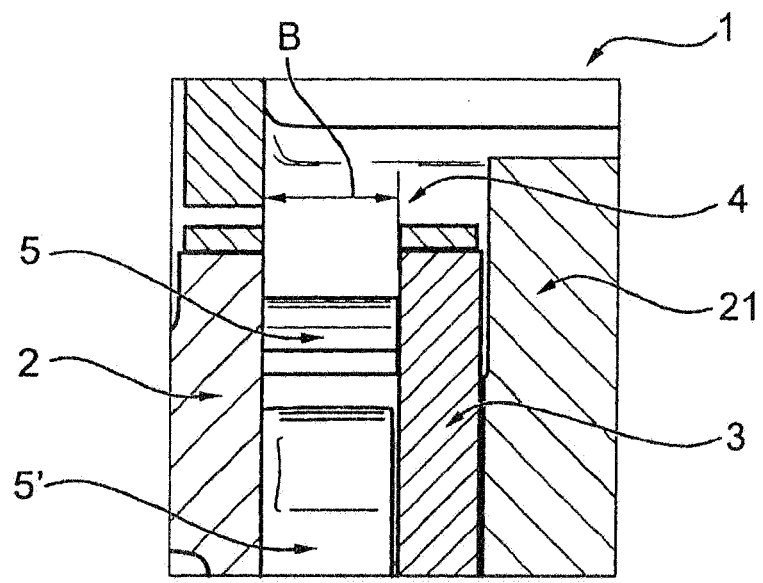
FIG. 2 shows the basic design of a blade bearing ring arrangement in which the principles of the present invention explained on the basis of FIGS. 3 to 6 can be realized.

FIG. 2 illustrates the basic structure of a blade bearing ring arrangement 1.

The blade bearing ring arrangement 1 has a blade bearing ring 2, in which guide blades 5' are rotatably mounted, and a disk 3. To be able to form for the guide blades 5' a flow duct 4 of a defined width B, the blade bearing ring arrangement 1 is provided with a spacer device 5 formed as an inlet guide grate 6.

The inlet guide grate 6 has a multiplicity of first movable inlet guide blades 8.

Figure 3:
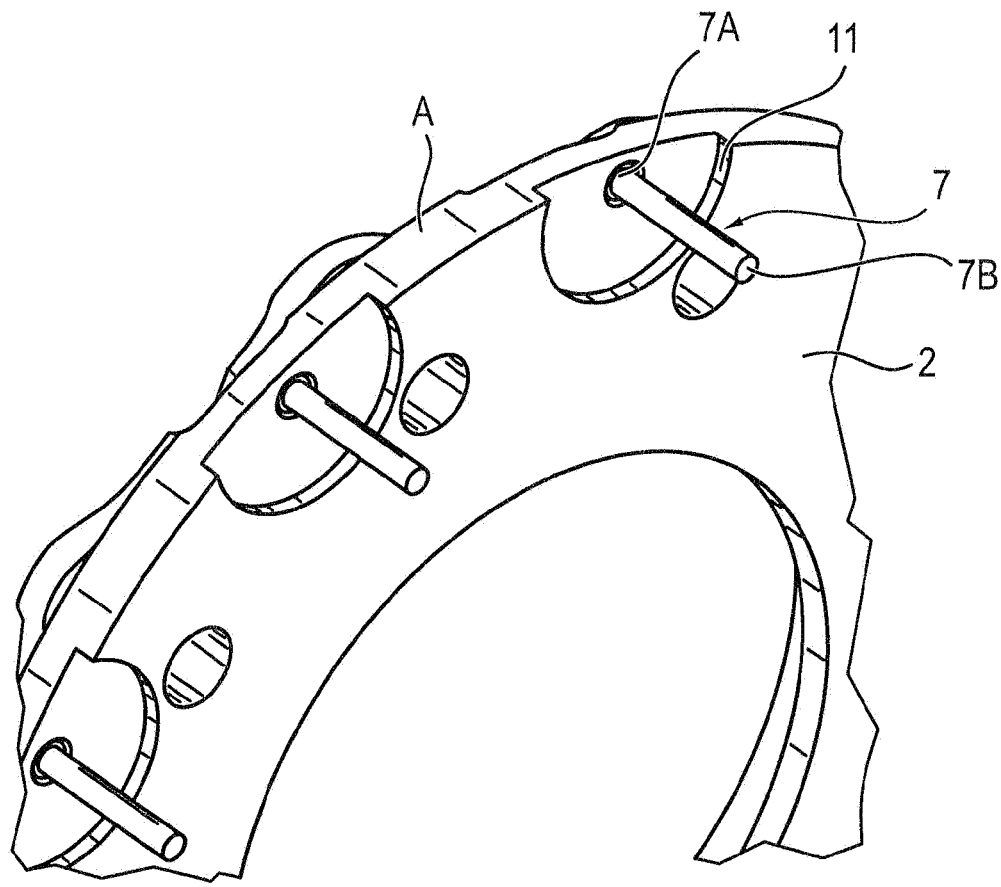
FIG. 3 shows a perspective detail view of a blade bearing ring of the blade bearing ring arrangement.

FIG. 3 illustrates a part of the blade bearing ring 2 which, in its outer circumferential region, is provided with a multiplicity of recesses/milled-out portions 11. As shown in FIG. 3, in the region of recesses of which one recess is denoted representatively by the reference symbol 11, there is arranged in each case one spacer pin 7 which is a part of the spacer device 5 which is arranged between the blade bearing ring 2 and the disk 3 so as to set the defined width B of the flow duct 4. As shown in FIG. 3, the spacer pin 7 is connected, preferably butt-welded, with its first end 7A to the blade bearing ring 2 within the recess 11. As is also shown in FIG. 3, the recesses 11 are formed so as to be open in the direction of the outer circumferential region A and are at least substantially semi-circular.

FIG. 4 again shows the blade bearing ring 2 with its milled-out portions 11 and the pins 7 arranged therein. Furthermore, FIG. 4 shows the arrangement of an adjusting ring 10 which is provided with a multiplicity of engagement recesses 13.

Figure 4:
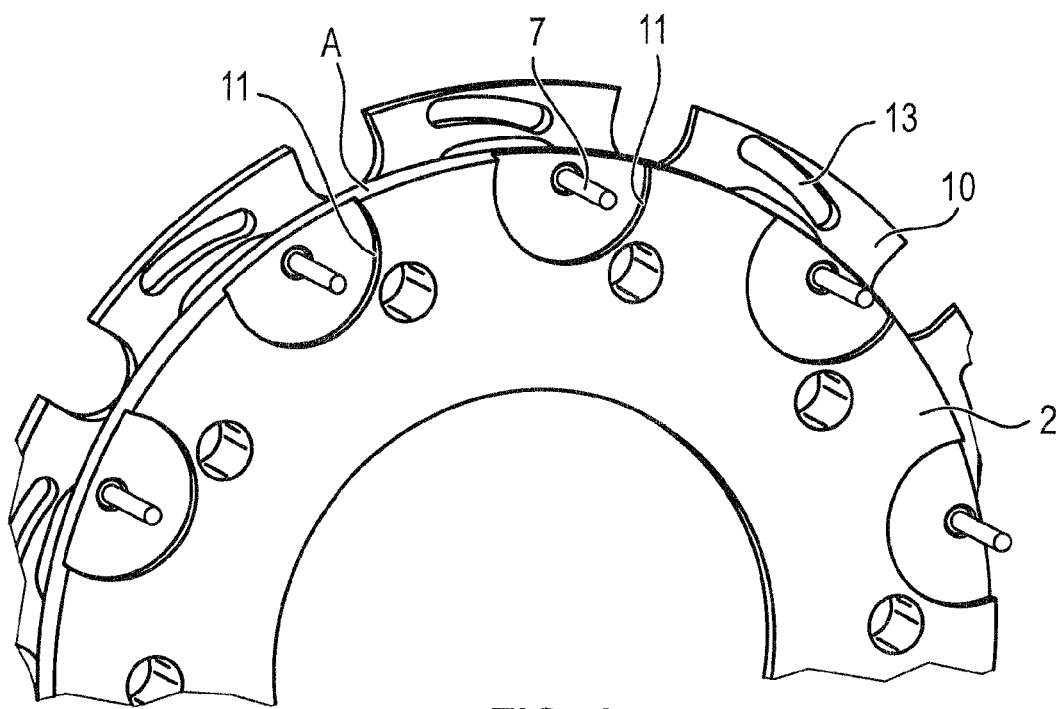
FIG. 4 shows an illustration of the blade bearing ring corresponding to FIG. 3, with adjusting ring attached.
Figure 5:
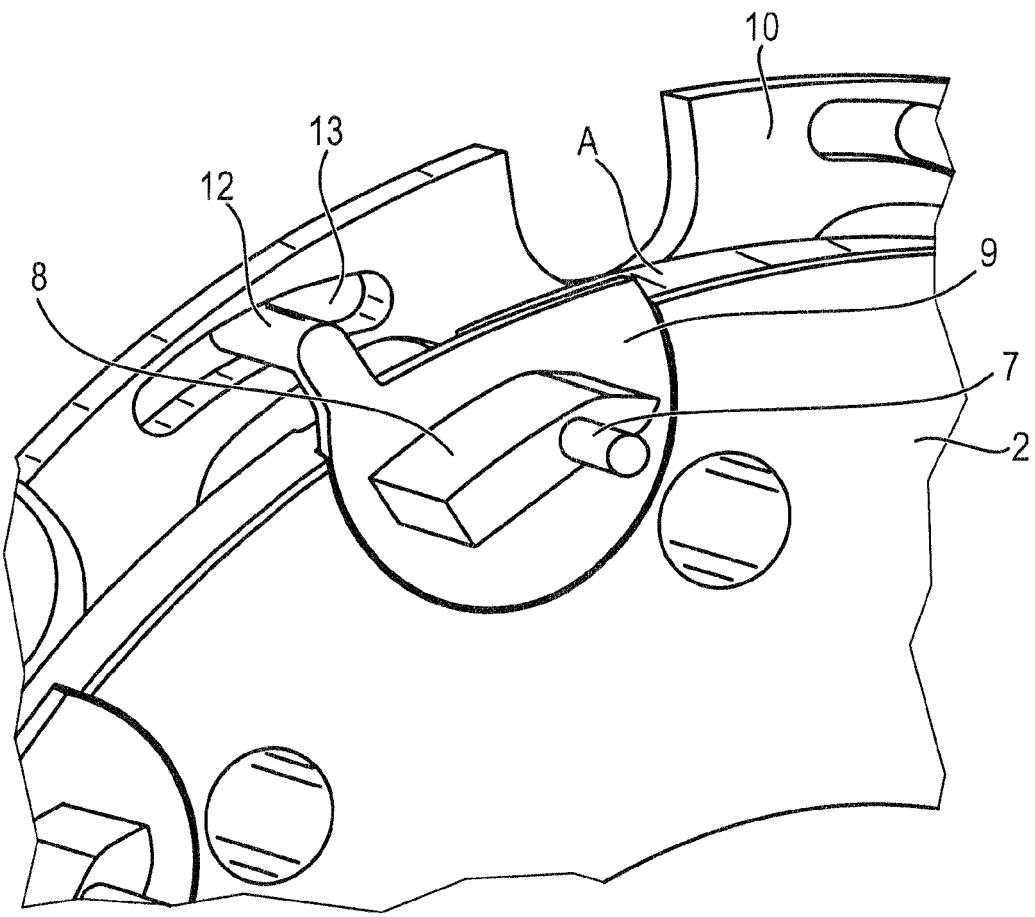
FIG. 5 shows an enlarged illustration, corresponding to FIG. 4, of a part of the blade bearing ring with adjusting ring and an inlet guide blade mounted.

Viewing FIGS. 4 and 5 together, it is clear that said engagement recesses 13 serve for receiving an engagement peg 12 which is part of a rotary plate 9 which is provided with an inlet guide blade 8. Here, the thickness of the rotary plate 9 corresponds to the depth of the recess 11. To form the overall blade bearing ring arrangement 1, a rotary plate 9 of said type with inlet guide blade 8 is mounted on each of the provided pins 7, wherein FIG. 5 shows that, during the course of the mounting of the rotary plate 9 onto the pin 7, the outwardly pointing engagement peg 12 is inserted into the engagement recess 13. The pin 7 and the engagement recesses 13 in the adjusting ring 10 thus serve, respectively, for the guidance and pivoting of the inlet guide blades 8.

Figure 6:
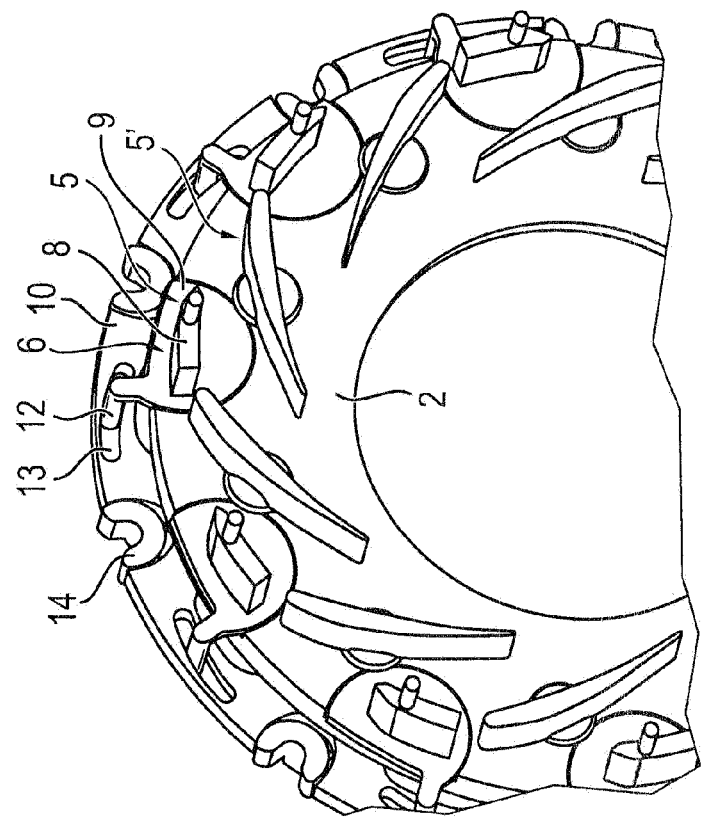
FIG. 6 shows a perspective illustration of a part of the blade bearing ring with guide blades mounted.

FIG. 6 shows the state of the blade bearing ring arrangement 1 after the insertion of the guide blades 5', wherein it is clear that one inlet guide grate 6 is provided per guide blade 5', said inlet guide grate comprising the spacer pin 7 and the rotary plate 9 with its inlet guide blade 8 and its engagement peg 12.

Figure 7:
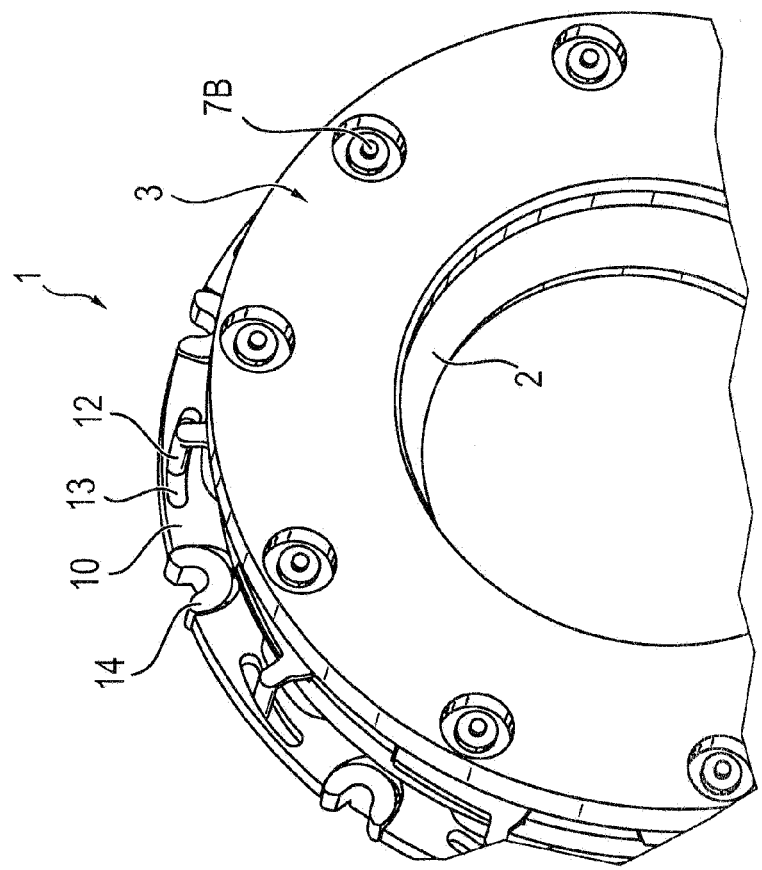
FIG. 7 shows an illustration, corresponding to FIG. 6, of the blade bearing ring on which a disk for completing the blade bearing ring arrangement is arranged.

FIG. 7 illustrates the fully assembled state in which the disk 3 is fastened, preferably welded, to the other end 7B of the spacer pins 7. In said state, the blade bearing ring arrangement 1 forms a preassembled cartridge of the variable turbine geometry (VTG) of the turbocharger 15. FIGS. 6 and 7 also show a multiplicity of adjusting levers, of which one is denoted by the reference numeral 14, which engage into corresponding recesses of the adjusting ring 10 and serve for the adjustment thereof into the different load-dependent positions of the blade bearing ring arrangement 1.

Figure 8:
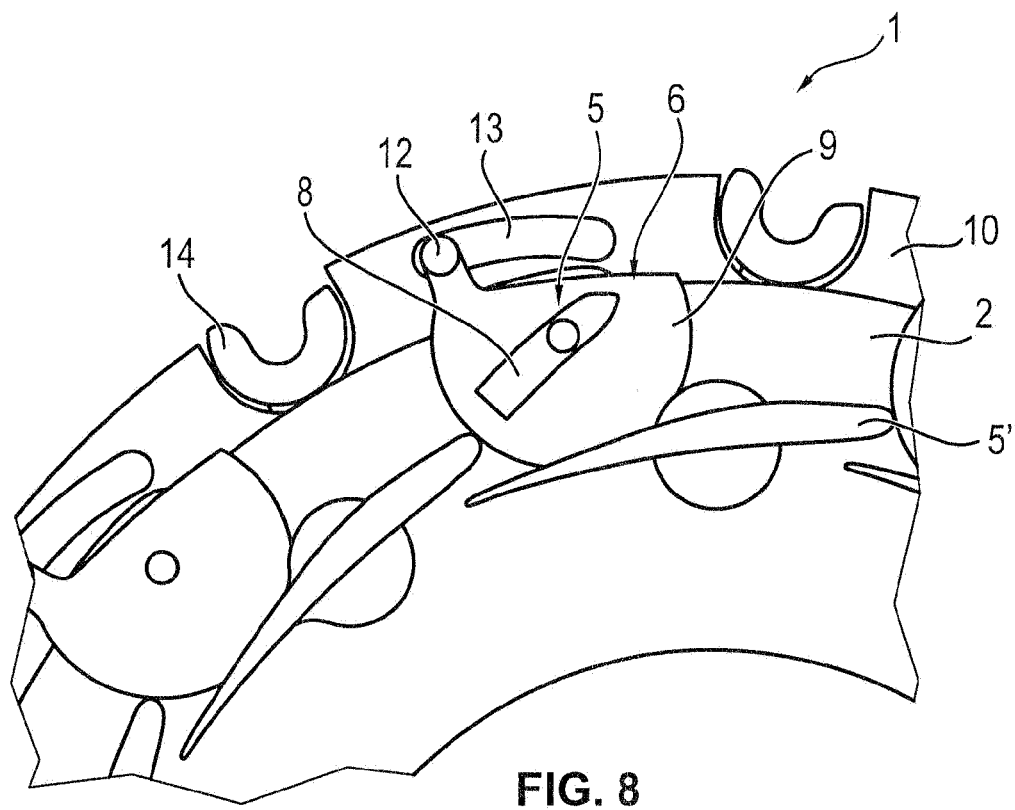
FIGS. 8 to 10 show detail illustrations of the blade bearing ring arrangement (without disk) for explaining the position of the guide blades and of the inlet guide blades in different load states.

FIG. 8 shows the blade bearing ring arrangement 1 in a minimum position, wherein, to clearly illustrate said minimum position, the disk 3 is not illustrated. In said minimum position, the guide blade ring formed by the guide blades 5' is closed and the inlet guide blades 8 cause virtually no deflection of the spiral flow.

Figure 9:
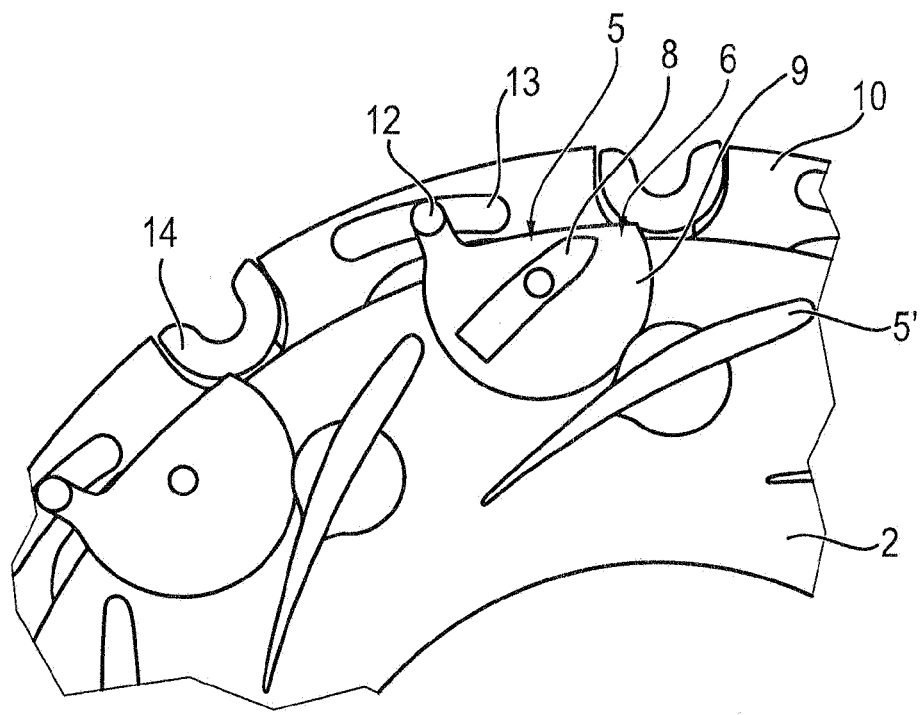
Figure 10:
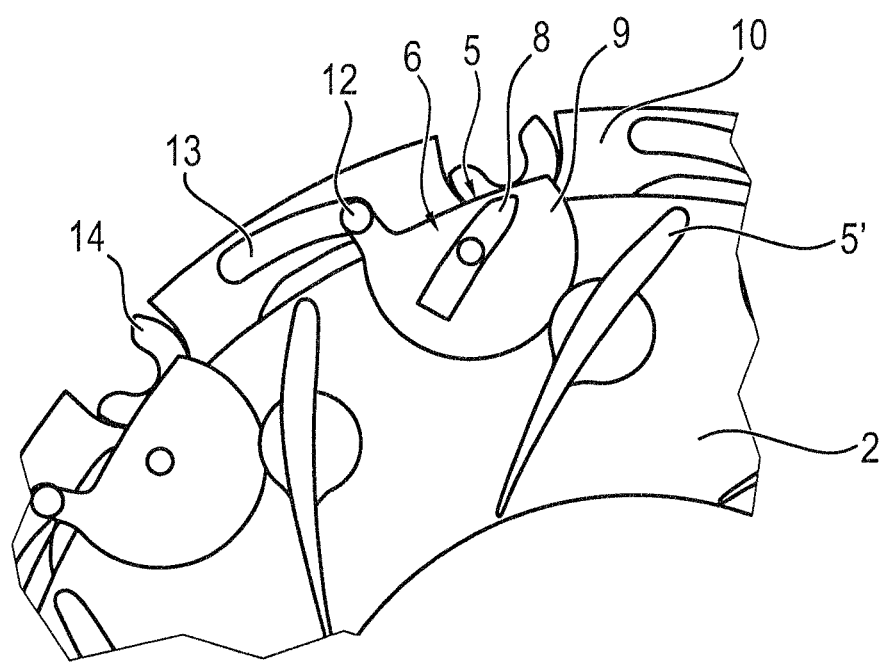

FIG. 9 shows the blade bearing ring arrangement 1, again without the disk 3, in a medium load position of the VTG, whereas FIG. 10 shows the VTG in the full load position. It should be emphasized here that an excessively intense deflection in the region of the inlet guide blades 8 is avoided at all times. The position, which can be seen by viewing FIGS. 8 to 10 together, of the blade bearing ring arrangement 1 with its inlet guide grate 6 yields considerable thermodynamic advantages and minimizes the adverse effects that the spacer device 5 has on the exhaust-gas flow through the VTG.

To supplement the written disclosure above, reference is hereby explicitly made to the diagrammatic illustration thereof in FIGS. 1 to 10.

LIST OF REFERENCE SYMBOLS

1 Blade bearing ring arrangement/cartridge of the VTG
2 Blade bearing ring
3 Disk
4 Flow duct
5 Spacer device
5' Guide blade
6 Inlet guide grate
7 Spacer pin/peg
7A, 7B First and second ends of spacer pin 7
8 Movable inlet guide blade
9 Rotary plate
10 Adjusting ring
11 Recess/milled-out portion (curved slot)
12 Engagement peg
13 Engagement recess
14 Adjustment lever
15 Turbocharger
16 Compressor wheel
17 Compressor housing
18 Bearing housing
19 Shaft
20 Turbine wheel
21 Turbine housing
A Outer circumferential region of the blade bearing ring 2

The invention claimed is:

1. A turbocharger (15) with variable turbine geometry, having
a blade bearing ring arrangement (1) which has a blade bearing ring (2) and a disk (3) which is fixed to the blade bearing ring (2) so as to create a flow duct (4),
guide blades (5') mounted in the blade bearing ring (2), and
a spacer device (5) which is arranged between the blade bearing ring (2) and the disk (3) so as to set a defined width (B) of the flow duct (4),
wherein
the spacer device (5) is an inlet guide grate (6) which has movable inlet guide blades (8) which are arranged in each case on a spacer pin (7) which is fixed with its first end (7A) to the blade bearing ring (2), and
each inlet guide blade (8) is arranged on a rotary plate (9) which is guided in a recess (11), provided on the blade bearing ring (2) in the outer circumferential region (A).

2. The turbocharger as claimed in claim 1, wherein the inlet guide blades (8) have a streamlined profile.

3. The turbocharger as claimed in claim 1, wherein the rotary plate (9) is provided with an engagement peg (12) which engages into an engagement recess (13) of an adjusting ring (10).

4. The turbocharger as claimed in claim 3, wherein the engagement recess (13) is formed as a slot which runs in a curved manner.

5. The turbocharger as claimed in claim 1, wherein the spacer pin (7) is connected with its first end (7A) to the blade bearing ring (2) within the recess (11).

6. The turbocharger as claimed in claim 1, wherein the second end (7B) of the spacer pin (7) is connected to the disk (3).

7. The turbocharger as claimed in claim 5, wherein the first end (7A) and the second end (7B) are in each case welded to the blade bearing ring (2) and to the disk (3) respectively.

8. The turbocharger as claimed in claim 7, wherein the first end (7A) and the second end (7B) are in each case butt-welded to the blade bearing ring (2) and to the disk (3) respectively.

9. The turbocharger as claimed in claim 1, wherein the recess (11) is formed so as to be open in the direction of the outer circumferential region (A) of the blade bearing ring (2).

10. The turbocharger as claimed in claim 1, wherein the spacer pin (7) extends through the rotary plate (9) and the inlet guide blade (8).

11. A method for producing a blade bearing ring arrangement (1), having the following method steps:
arranging spacer pins (7) within recesses (11) of a blade bearing ring (2);
arranging an adjusting ring (10) in the outer circumferential region (A) of the blade bearing ring (2);
mounting rotary plates provided with in each case one inlet guide blade (8) onto the spacer pin (7), and placing the rotary plates (9) into the recess (11) of the blade bearing ring while simultaneously inserting an insert peg (12) of the rotary plate (9) into associated engagement recesses (13) of the adjusting ring (10);
attaching guide blades (5') to the blade bearing ring (2);
connecting the guide blades (5') to blade levers; and
connecting a second end (7B) of the spacer pin (7) to a disk (3) of the blade bearing ring arrangement (1).

* * * * *